Patented July 15, 1947

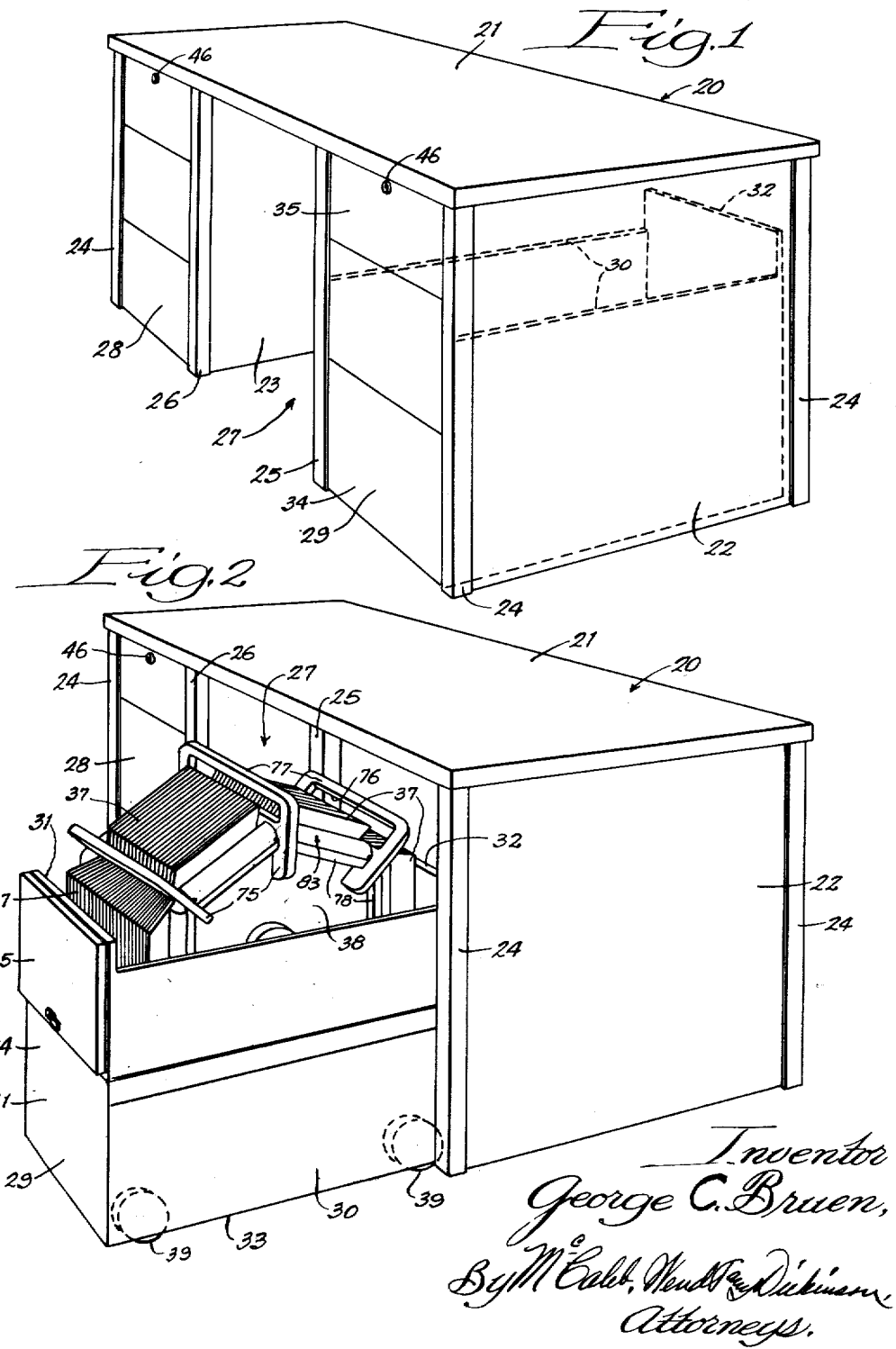

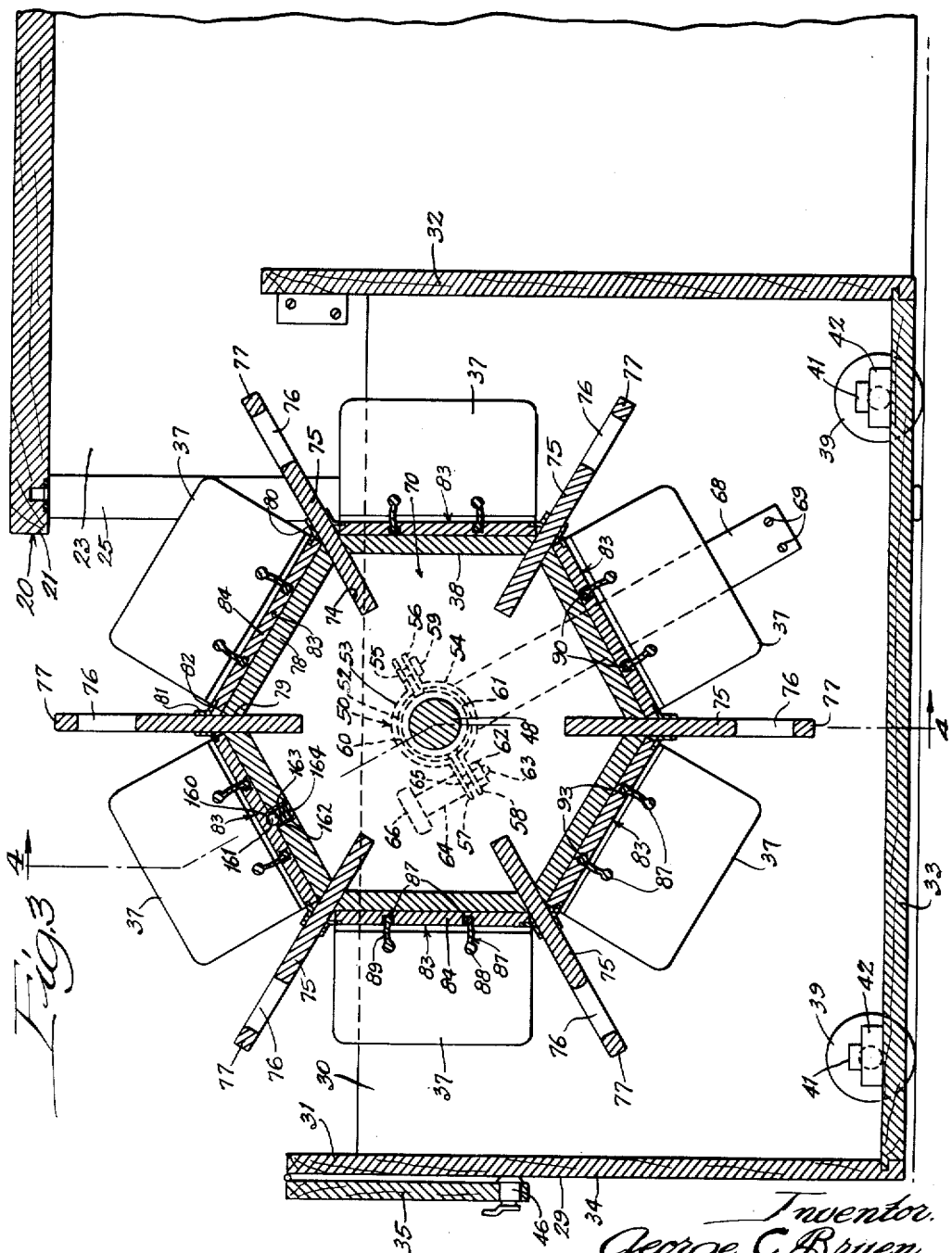

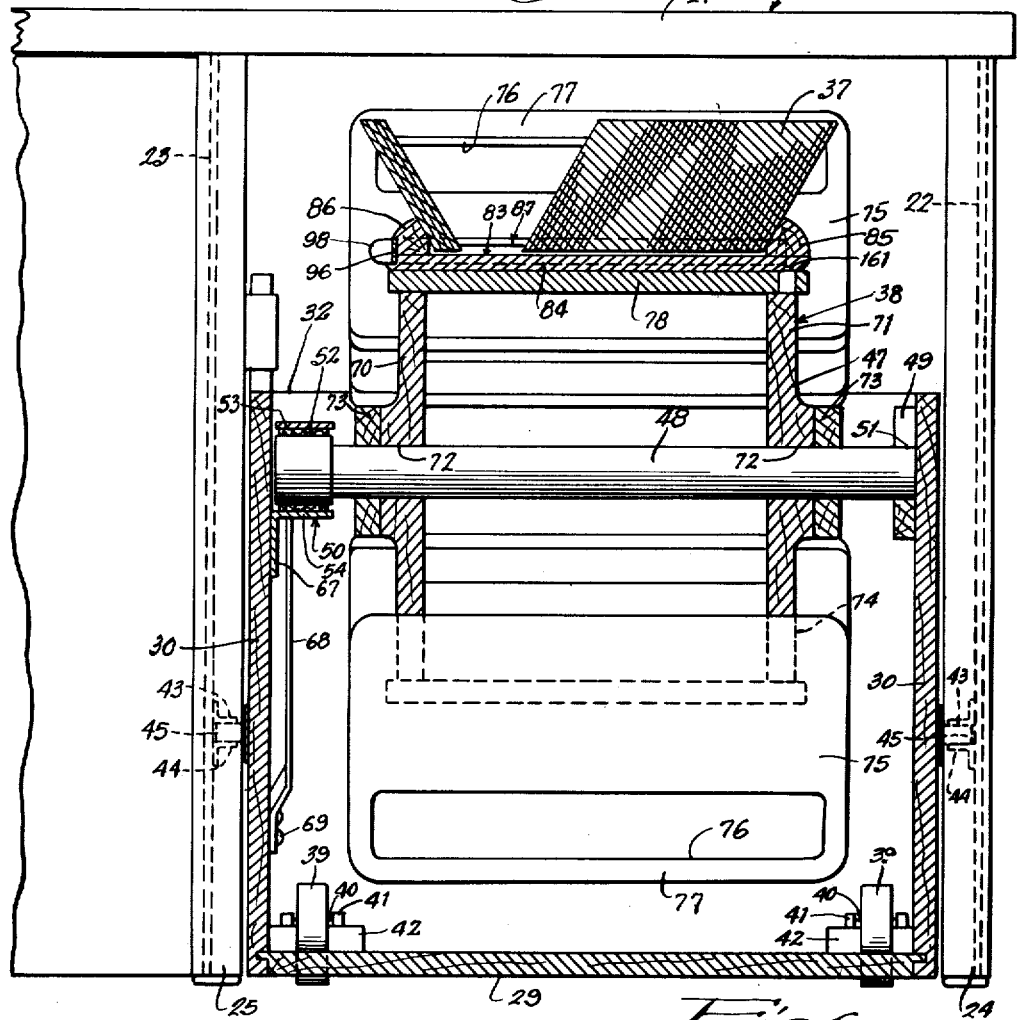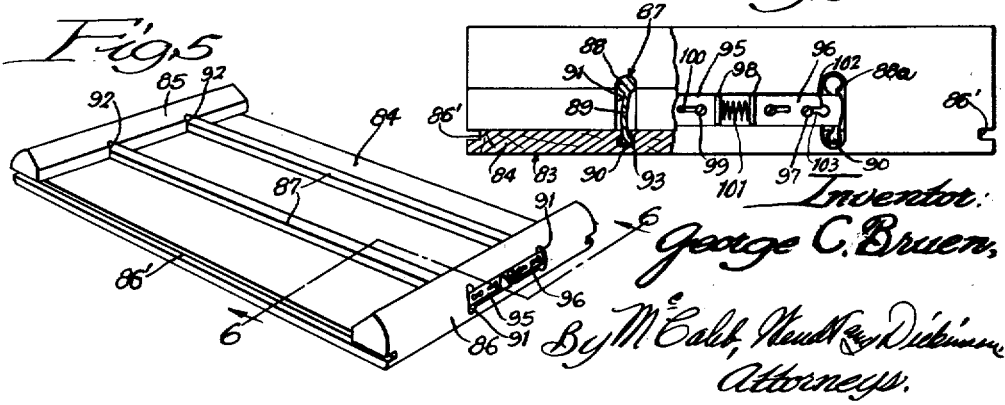

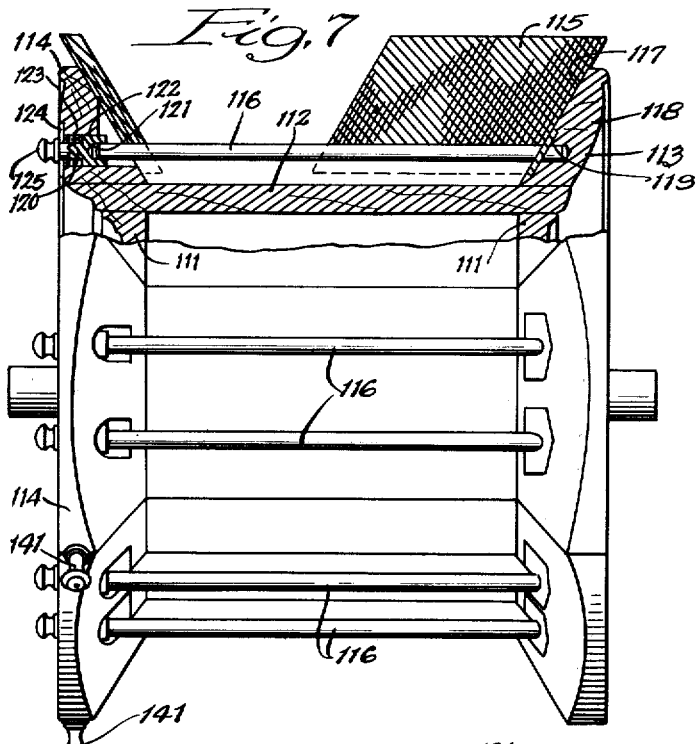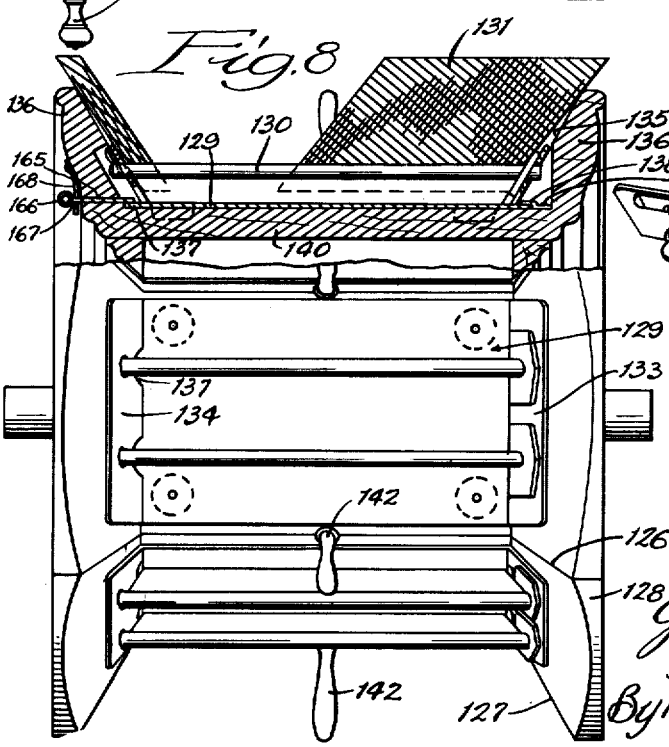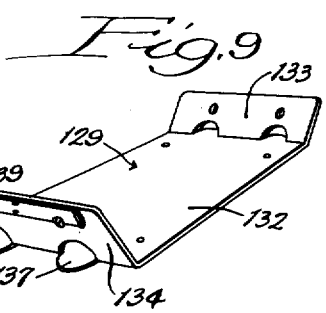

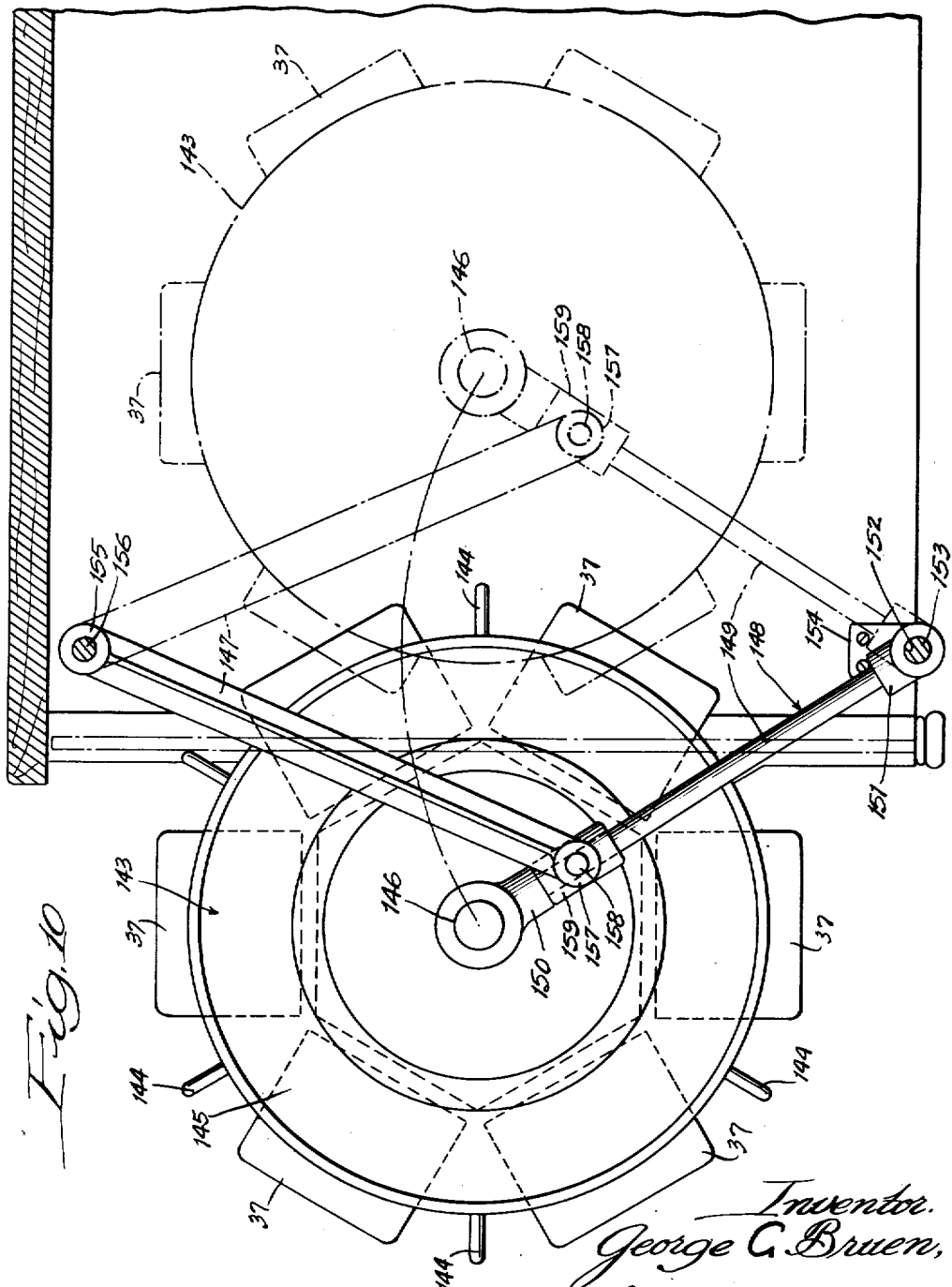

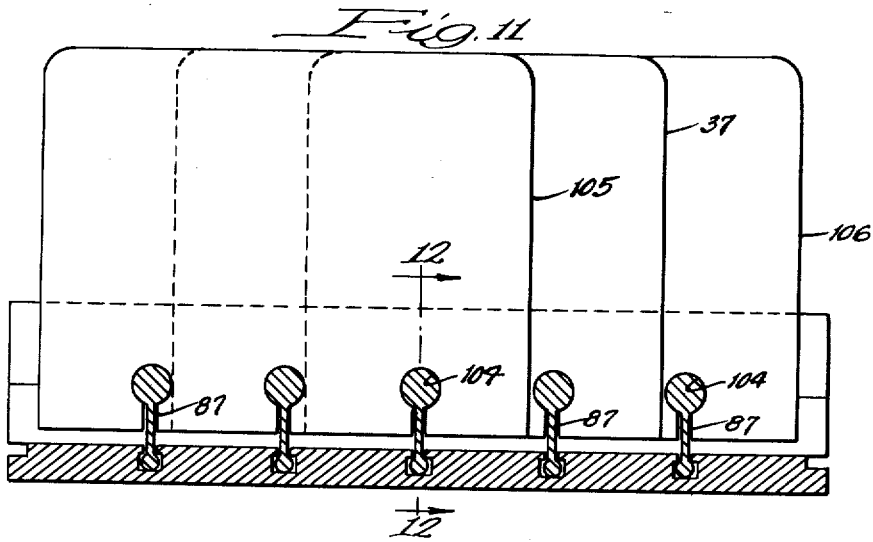
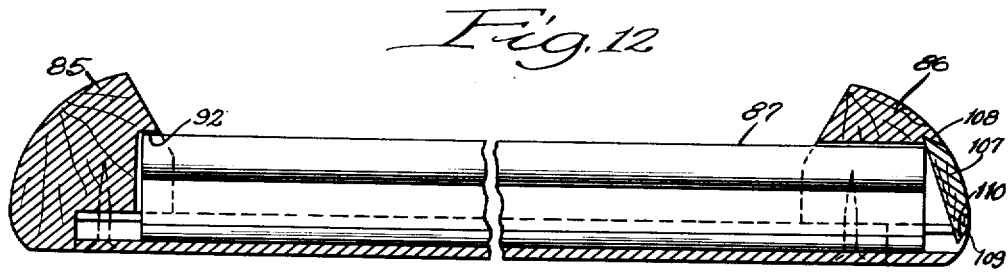

2,424,144

UNITED STATES PATENT OFFICE 2,424,144

CARD FILING EQUIPMENT

George C. Bruen, Chicago, Ill., assignor, by mesne assignments, of thirty-five and one-half per cent to himself, thirty-five per cent to Sophie E. Bruen, Chicago, Ill., five per cent to Edna V. Dickinson, Highland Park, Ill., nine per cent to Sarah M. Bullock, Wilmette, Ill., ten and one-half per cent to G. A. Stuart, Washington, D. C., two per cent to Jay Fisher, Chicago, Ill., one per cent to Marie Thoenen, Elmwood Park, Ill., one per cent to George H. Fredericksen, Chicago, Ill., and one per cent to E. M. Thorsen, St. Joseph, Mo.; Sophie E. Bruen, executrix of said George C. Bruen, deceased Application November 8, 1943, Serial No. 509,389

11 Claims. (Cl. 45—3)

The present invention relates to card filing equipment, and is particularly concerned with the type of card filing equipment in which a multiplicity of cards are to be supported peripherally of one or more rotatable members adapted to be housed inside a desk or other suitable work support.

One of the objects of the invention is the provision of an improved card filing equipment adapted to be housed in a structure resembling an office desk, such as a desk for an executive, and adapted to provide for the convenient and expeditious handling of a large number of cards.

Another object of the invention is the provision of card filing equipment of the class described, comprising one or more rotatable members which are provided with card-carrying trays adapted to be mounted on said rotatable members and to be brought into operating position with a minimum amount of effort so as to facilitate the filing, examination of, or recording on the cards.

Another object of the invention is the provision of improved card filing equipment of the class described which is adapted to be constructed by means of the use of a minimum amount of metal, and which is sturdy, serviceable, and adapted to be manufactured at a low cost so that its price may be made low enough for a large number of users.

Another object of the invention is the provision of improved filing equipment of the class described which makes provision for the filing of the cards in offset position toward either side of the stack of cards so that certain cards may be set aside in their proper order to be made the subject of special attention.

Another object of the invention is the provision of an improved form of rotatable members for supporting card filing equipment having improved pull bars for actuating the rotatable member and having an improved form of brake which is adapted to be adjusted to provide the exact degree of friction desired.

Another object of the invention is the provision of improved forms of removable trays for card filing equipment of the class described which utilize a minimum amount of metal and which are adapted to be removed from the rotatable member at will.

Another object of the invention is the provision of an improved form of card filing equipment which may be conveniently brought into position for reading or handling of cards and having data placed thereon in a direction transverse to the usual arrangement and the provision of improved equipment including rotatable members and removable trays, the elements of which are adapted to be removed as a whole from their housing and conveniently moved on rollers provided to any other point for convenient use.

Another object of the invention is the provision of an improved card filing equipment of the class described, including one or more rotatable members, in which these members are mounted upon a supporting linkage of levers, by means of which they may be moved in and out of a housing such as an executive's desk, with a minimum amount of effort.

Other objects and advantages of the invention will be apparent from the following description and the accompanying drawings, in which similar characters of reference indicate similar parts throughout the several views.

Referring to the drawings,

Fig. 1 is a view in perspective of card filing equipment embodying the invention, showing its appearance when the desk or housing is completely closed, with the equipment inside;

Fig. 2 is a similar view, showing how one of the rotatable members appears when it has been drawn out of the desk, with its supporting drawer;

Fig. 3 is a vertical sectional view, taken on a vertical plane passing through the drawer and rotatable member of Fig. 2, the plane being parallel to the end wall of the desk;

Fig. 4 is a fragmentary sectional view, taken on the plane of the line 4—4 of Fig. 3, looking in the direction of the arrows;

Fig. 5 is a view in perspective of one form of card tray embodying the invention;

Fig. 6 is an end elevational view in partial section, showing details of construction of the tray;

Fig. 7 is a side elevational view of another form of rotatable member in partial section, to show the mode of securement of the card-carrying bars;

Fig. 8 is a view similar to Fig. 7 of another modified form of rotatable member, with a removable card tray;

Fig. 9 is a view in perspective of the removable card-carrying tray of Fig. 8;

Fig. 10 is a view similar to Fig. 3, showing another form of mechanism for supporting the rotatable member, which includes a pivoted linkage;

Fig. 11 is a sectional view, taken on the plane of the line 11—11 of Fig. 12, showing the details of construction of a special tray peculiarly adapted to support any cards desired in offset position, either toward the left or the right of the stack of cards;

Fig. 12 is a sectional view, taken on the plane of the line 12—12 of Fig. 11, looking in the direction of the arrows.

Referring to Fig. 1, 20 indicates in its entirety the card filing equipment embodying the invention, which is preferably supported and completely enclosed in a housing, such as an office desk, having a desk top 21, and the usual side and end panels 22, 23, these panels being carried by the corner posts 24 and the intermediate posts 25 and 26.

The inside panels 23 carried by the intermediate posts 25 and 26 define an open space below the table top 21, which may be used for receiving the feet and legs of the operator sitting in a chair in front of the open space 27, but in some embodiments of the invention this space may be utilized for additional equipment.

This form of the invention provides drawer space for drawers at each side of the operator, which drawers are located between the posts 24—26.

In some embodiments of the invention the table top may be cut off immediately toward the right of the right-hand posts 25, providing a form of desk similar to those which are utilized for clerical employees or stenographers, and in other forms of the invention the desk top may be limited to a size suitable for covering one drawer space above a drawer which is located between the posts 24, 25.

The equipment preferably includes a pair of drawers, indicated in their entirety by the numerals 28, 29 in Fig. 1; and, as each of these drawers may be identical in construction, only one of them will be described. For example, the right-hand drawer 29 may be provided with a pair of sides 30, the front and rear walls 31, 32, and a bottom wall 33, and its front wall may be separated into two pieces, the lower piece being indicated by the numeral 34, and the upper one by the numeral 35.

The upper part of the front wall is hinged by means of hinges 36 so that it may be turned down to lie flat against the front wall 31 and to expose the cards 37 which are carried by rotatable member 38 for more convenient operation. Drawers 28, 29 each are preferably provided with four rollers 39 located to project from apertures in the bottom wall 33 and carried by the side walls 30 adjacent the front and rear walls 31, 32.

These rollers 39 rest upon the floor and permit the drawer to be pulled outward and pushed backward with a minimum amount of effort, and the front wall 31 may be grasped at its upper edge for this purpose.

Referring to Fig. 4, the rollers 39 are mounted on pins 40, which rotate in the bearings 41 carried by blocks 42. The drawers are also preferably provided with suitable horizontally extending guides 43, 44 mounted on walls 22, 23 in the form of angle irons or strips of wood for slidably engaging the guide members 45 carried by the drawer side walls 30. These guides may be arranged to retain the drawer in its housing and to limit its outward movement when the guide members 45 strike the front posts 24, 25 so that the desk may be handled or turned over without the drawers falling out.

In other embodiments of the invention the guides 43—45 may be eliminated after the desk has been located in its proper position so that the drawers 28, 29 may be pulled out and rolled anywhere on the floor of the office by means of the rollers 39 for convenient use in any department.

The drawers may be locked by means of a suitable rotatable tumbler barrel 46 carried by the pivoted part 35 of the front wall 31, which has a keeper that projects into the slot in the lower side of the desk top 21.

Referring to Figs. 3 and 4, these are sectional views showing a preferred form of the rotatable member which is carried by each of the drawers 28, 29. This rotatable member is indicated in its entirety by the numeral 47, and it is preferably mounted on a cylindrical wooden shaft 48 that is rotatably carried by the bearings 49, 50 carried by the walls 30 of the drawer.

The bearing 49 may consist of a wooden block glued or otherwise secured to the wall 30 and provided with a cylindrical bore 51 for receiving the complementary end of the shaft 48.

The bearing 50 is preferably of a type adapted to place a predetermined amount of friction on the shaft 48. The shaft is preferably provided with a cylindrical enlargement 52 at this end. The bearing 50 may consist of two parts, as shown in Fig. 3, each of which is provided with a semi-cylindrical bearing portion 53, 54, and with the attaching flanges 55, 56, 57, and 58 at the ends of these bearing portions.

The attaching flanges 55 and 56 may be fixedly secured together by a suitable screw bolt or other fastening means, indicated at 59. The two bearing portions 53, 54 are preferably lined with strips of leather, fiber, or other friction material 60, 61 for engaging the enlarged cylindrical portion 52 and placing predetermined friction on the shaft to oppose its rotation.

The amount of friction may be regulated by having the flanges 57, 58 spaced from each other, and the lower flange 58 may have a nut 62 welded to it for receiving the lower threaded end 63 of an adjustment screw 64, the annular shoulder 65 of which bears on the upper flange 57.

A knurled handle 66 permits the more convenient adjustment of this threaded member 64 to tighten the parts of the friction bearing 50 on the shaft.

The lower bearing portion 54 may have an attaching flange 67, which is secured to the side wall 30 by screws or other convenient fastening means, and the other bearing portion 53 may have an integral arm 68 secured thereto and extending parallel to the side wall 30 of the drawer to which it is secured at its lower end by means of screw bolt 69.

This gives the bearing 50 a point of securement to the side wall at a place which is at a considerable distance so as to resist the turning torque which is exerted on the bearing by the shaft 48. Thus the friction may be so adjusted that, if desired, the rotatable members will turn freely, or they may be arranged to stay in any adjusted position in spite of the fact that certain of the card trays have been removed and the rotatable member is temporarily out of balance.

The rotatable member 47 may be constructed almost entirely out of wood by providing the hexagonal end walls 70, 71 of wood, having centrally located bores 72 for receiving the shaft 48. An auxiliary wooden plate 73 on each end wall 70, 71 surrounds the shaft and gives additional surface for securement of the rotatable member to the shaft by gluing or other convenient means.

It should be understood that while the present rotatable member is made hexagonal in form for a particular size of cards and a particular size of desk or housing, these rotatable members may have more or less sides and may in fact be made with any desired number of sides.

The end walls 70, 71 are slotted at their corners, the rectangular slots 74 serving to receive the partition frame members 75 of wood, which project radially outward and are provided with elongated rectangular apertures 76 so as to form the elongated pull bars 77.

These pull bars 77 are provided with rounded formations so as to fit the hand conveniently, and they may be used by the operator by pushing or pulling to rotate the rotatable member to bring it to any desired position.

In order to provide a plurality of bases and supports for the cards 37, the end walls 70, 71 of each rotatable member carry the side walls 78, which are rectangular in plan, and which have their edges 79 beveled and spaced sufficiently to receive the partition members 75, to which they are glued.

On each side each partition member 75 may carry a sheet metal guide 80 consisting of a strip of sheet metal having an attaching flange 81 and a guiding flange 82, these flanges being at an obtuse angle so that the guiding flange extends parallel to the base or side wall 78 of the rotatable member.

The guide members 80 may be secured to the partitions 75 by wood screws. Each of the side walls 78 is adapted to carry a card tray, indicated by the numeral 83, and one form of the card tray is shown in perspective in Fig. 5. It may consist of a flat piece of wood, such as the base member 84, which may be of plywood, and a pair of relatively narrow end wall members 85, 86, which are adapted to carry the card-supporting bars 87. The base 84 is provided with a slot 86' in each of its edges for receiving the guide flanges 82 of guide members 80 and slots 86 extend also through the end walls 85, 86.

Referring to Fig. 6, one convenient form of card-supporting bar is shown here at 87, and this bar preferably has a cylindrical upper portion 88a, a relatively thin body flange 89, and a smaller cylindrical head 90 at its lower edge. The end walls 85, 86 are provided with apertures 91 for passing these bars, which project into the end walls, but in the end wall 85 the aperture 92 is merely a socket closed at its left end so as to confine the bars 87.

The end wall 86 of the tray has a through aperture 91 so that the bars 87 may be removed or placed in their appropriate slots. The base 84 has a pair of slots 93, which are wider at the bottom so that they may receive the head of the bar 87.

The bars 87 may be held in place on the tray 83 by means of a pair of apertured metal plates 95, 96 mounted on wood screws 94. The end wall serves as a base for slidably supporting the latching plates 95, 96, which have laterally turned finger-engaging flanges 98 opposing each other.

The plates 95, 96 are slidably mounted on the wall 86 by means of the screws 97 mounted in the slots 100 in the plates 95, 96, and the plates are pressed apart by a compression coil spring 101. The screws 97 are carried by the wooden end wall 86, and they are adapted to pass through the enlargement 102 in the slot 103 of each plate, and to secure the plates to the end wall when they are in the position of Fig. 6.

When the flanges 98 are pressed together, the enlarged hole 102 is brought into registry with the screw 97 so that the plates 95—96 may be removed. The plates 95, 96, being secured in a shallow groove in the end wall 86 and extending over the apertures 91, the plates hold the bars 87 on the trays by engaging the ends of the bars. The bars 87 may be removed by first removing the plates 95, 96.

The present card filing equipment is adapted to support cards of the type shown in Fig. 11, in which the cards 37 are arranged in several different positions.

In the modification shown in Fig. 5, only two bars 87 are employed, with slots 104 of complementary shape in the cards 37.

In the modification of Fig. 11, five of the bars 87 are employed, and the card which is indicated at 37 is one which is in alignment with the regular stack of cards.

These cards have three slots 104, and they are ordinarily supported by the three centrally located bars 87. The outer bars 87 serve to support the cards when they are in the positions indicated by cards 105 or card 106. Thus, cards 105 and 106 may be offset from the regular stack 37 for a special purpose so as to indicate which cards need special attention, either for entry on the cards or for the taking off of records from the cards for a particular purpose.

The trays are preferably provided on their lower sides with a partially spherical socket 160 (Fig. 3) for engagement with a spring pressed ball 161 that protrudes from the end, but which is confined in a metal tube 162, spring pressed by a helical spring 163 for engagement with the closed end 164 of the tube 162.

The ball 161 and socket 160 serve as stops for holding the trays in centered position where the cards will not engage the sides of the drawers. The ball only projects far enough, however, so that it is cammed into its tube by the walls of its socket when the tray is slid in its sockets to a different position. Thus it serves as an automatic latching device.

Fig. 12 shows another form of tray in which the construction of the tray may be exactly similar to that previously described, except that the bars 87 are held in place by a wooden strip 107. This wooden strip has beveled edges 108, 109, which give its body a dove-tailed form for fitting in a complementary dove-tailed slot 110. The dove-tailed slot is arranged in the end wall 86 of this tray for receiving the dove-tailed strip 107, which holds the bars 87 in their place.

The bars 87 may be removed by first sliding the dove-tailed strip 107 out endwise from its slot 110. The bars 87 may be made of metal or of any suitable plastic material. In case they are made of plastic, they may be extruded to the shape shown.

Referring to Fig. 7, this is a modified form of rotatable member of a different construction. In this case end walls 111 are hexagonal in shape, and they support the side walls 112, which are ornamentally shaped or molded to correspond to and form a continuation of the ornamental outer surface of the end walls 111.

The side walls 112 support at each of their ends radially projecting wooden walls 113 and 114 adapted to serve as supports for the cards 115 and to carry the card-supporting rod 116.

These radial walls 113 and 114 are preferably formed with outwardly sloping inner surfaces 117 so that the cards are supported in a slanting position, and their outer surface 118 may be ornamentally shaped and curved to correspond to the ornamentation on the end walls 111 and ends of the side walls 112.

The rod 116 is supported in a socket 119 formed in the radially extending wall 113, and at its opposite end the radially extending wall 114 is provided with a socketed plunger 120, having a socket 121 for receiving the end of the rod 116.

The plunger 120 is slidably mounted in a bore 122 and is engaged by a helical spring 123, the other end of which engages a plate 124. A knob 125 is provided to permit the user to pull out the plunger 120 and release the rod 116.

In this case all of the cards may be removed from the receptacle which is provided by the side wall 112 and the radially extending walls 113 and 114. The radially extending walls 113, 114 are preferably wedge shaped so that when their edge surfaces 126, 127 are joined to the edge surfaces of similar wall members, a complete rim with a circular periphery 128 is provided for bordering the index cards that are carried by this rotary member.

Referring to Fig. 8, this is a rotary member of similar construction to that of Fig. 7 except that a separate metal or fiber or plastic tray 129 is provided for supporting the rod 130 and the cards 131.

In this case the tray 129 has a flat body portion 132 and diagonally upwardly extending flanges 133, 134 at each end, the slope of which corresponds to the slope of surface 135 on the inside of the radially extending rims 136.

The tray 129 has punched out of it the ears 137, which extend outwardly in the plane of the body portion 132. These ears are adapted to engage under the guide flanges 138 of the metal strip 139, which is secured to the side wall 140 of this rotatable member.

The opposite wall 136 is provided with a pair of apertures for receiving the spring pressed sheet metal bar 165, which engages above the ears 137 on this side, in the same manner as the flange 138. The sheet metal bar 165 has a handle 166 formed at its outer end and an aperture 167 for passing a thin spring 168, which urges it into the latching position shown in Fig. 8. Thus this latching member 165 may be withdrawn to remove the tray 129.

In Fig. 7 the radially projecting end walls 114, 133 are preferably provided with the spool type handles 141 located on one of these walls in convenient position for grasp by the operator in rotating the assembly.

In Fig. 8, however, a different type of handle 142 is provided. This handle is glued in a socket at the junction of each of the side walls 112.

Referring to Fig. 10, this is a diagrammatic illustration of another modification in which the rotatable member 143 is provided with handles comprising U-shaped metal rods 144 carried by the metal side flanges 145 of the rotatable member 143.

In this case the shaft 146 is carried by a linkage consisting of a pair of links 147, 148 on each side of the rotatable member 143.

The link 148 may comprise a cylindrical rod 149, provided at each end with the bearing fixtures 150, 151. The bearing fixture 151 has a bearing bore 152 for receiving a stub shaft 153, which is mounted on a base plate 154 carried by the adjacent panel of the desk, such as, for example, a panel carried by the posts 25. At its upper end the bearing portion 150 on the link 148 carries the shaft 146, which supports the rotatable member 143.

The link 147 may comprise a cast metal member having a bearing portion 155 at its upper end mounted on a stub shaft 156 carried by the inside panel of the desk. At its lower end the lever 147 is pivotally mounted by means of the bearing portion 157 and the trunnion 158 on the slider 159, which carries the trunnion 158.

The slider 159 is slidably mounted on the cylindrical rod 149. The linkage shown in Fig. 10 has two positions, the operative position, which is shown in full lines, and the storage position, which is shown in dotted lines.

The operation of this embodiment is as follows: The operator may grasp one of the U-shaped handles 144, and may rotate the rotatable card index supporting member 143 until this handle is toward the top. Then the operator may lift the assembly by means of the handle 144 and pull the handle 144 inward toward the position of storage. When this is done, the slider 159 will slide down the arm 149 and the shaft 146 will pivot over along the arc shown until it reaches the dotted line position.

It is only necessary to exert a lifting force until the shaft 146 has passed its highest position, after which it will automatically drop into the dotted line position shown in Fig. 10. The weight of the mechanism and the rotatable member and cards will hold the linkage in either of the positions shown, after it has once moved to that position.

The operation of the mechanism shown in Figs. 1 and 2 is as follows: The pull bars 77 may be used by the operator for effecting a rotation of the rotatable member 38 on its shaft. Assuming the mechanism to be locked up in storage condition, the drawer may be opened by applying a key to the tumbler lock 46. When this lock is opened, it will permit the hinged door 35 to swing down against the end portion 34 of drawer 31. Then the operator may grasp the upper edge of the drawer end 34 to pull the drawer out.

If the drawer is pulled out three fourths way, the cards may reach the position shown in Fig. 3, where the cards, which are at the upper left, are in a position to be used with data that extends crosswise of the length of the card. The operator would then move his chair to such a position that he could look at the cards in the manner of the leaves of a book.

When it is desired to use the cards for recording data with the print extending endwise of the card, then the drawer may be fully withdrawn and the cards that are being used may be moved to the upper horizontal position by means of a pull bar 77.

The brake on the shaft may be so adjusted that the rotatable member will be held in any position to which it is moved, and the brake friction may be increased whenever certain trays are removed to effect this holding, in spite of the assembly being out of balance.

Whenever any card is to be removed, it may be pulled off the bars 87 in the usual manner, preferably by effecting a slight twist, and it may be placed back on the bars by merely pushing it into place. During this action the adjacent portions of the card bend on account of their resiliency, but they are not broken or creased; and when the cards are replaced, the bars 87 are adapted to support the cards in any position which they may assume on the rotatable member.

When it is desired to utilize the card filing equipment at a point removed from its housing, the drawer may be pulled out entirely and rolled about on the rollers 39. When it is desired to remove one of the trays, this may be effected with the equipment of Figs. 1 to 3 by sliding the trays endwise out of their guides, with all of the cards carried on the tray.

The operation of the modifications of Figs. 7 and 8 will be apparent from the description of their structure. In Fig. 7 it is possible to remove all of the cards with the supporting rod 116. In Fig. 8, also, all of the cards may be removed with the rod 130, and the tray 129, as a unit.

In the modification of Fig. 11 provision is made by means of triple slotted cards and the use of five bars 87 for supporting any of the cards in offset position toward the right or the left of the stack of cards. This is advantageous whenever it is desirable to segregate cards without removing them from their regular order.

It will thus be observed that I have invented improved card filing equipment, by means of which a great number of cards may be supported and this equipment may be made practically entirely of wood, so that it is not necessary to utilize much metal at a time when metal is scarce. The present card filing equipment permits the operator to examine or remove the cards with a minimum amount of effort and to find the cards, which are suitably indexed and segregated in the easiest manner.

The pull handles may be provided with indicia for identifying the sections of cards and indicating separators which may be used on the cards wherever desired.

The present device is provided with a simple, yet effective brake for holding the rotatable member in any position to which the operator may move it, without placing too much friction on the rotatable member, which would otherwise tire the operator.

The present arrangement is flexible, as it may be made in units embodying two or more rotatable members, or it may be embodied in a smaller desk or a single housing containing a single rotatable member.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a card filing equipment, the combination of a support including a rotatable polygonal member having flat sides angularly disposed relative to one another about a central axis, said polygonal member being provided with outwardly projecting members disposed radially of said axis and having handle portions parallel to said axis, said outwardly projecting members being provided adjacent the flat sides with guide members substantially parallel to the flat sides and projecting into the space between said radially extending members, a tray having a base adapted to be slidably received between said guide members whereby the tray is mounted for sliding movement axially of the rotatable member for placement and removal, a pair of card retaining members carried by said tray base, said card retaining members extending axially of the rotatable member and being adapted to be located in substantially complementary apertures in a multiplicity of cards whereby the cards are mounted for movement axially of the rotatable member, and said tray with the cards may be slid axially with respect to said rotatable member to a position in which it projects beyond said sides of the rotatable member.

2. A card filing equipment comprising a supporting frame having bearings for a horizontal shaft, a horizontal shaft mounted in said bearings and a rotatable supporting member carried by said shaft, a plurality of card supporting trays mounted in planes extending substantially parallel to said shaft on said supporting member, and means for supporting said card trays for movement laterally of said supporting member in a direction similar to that of the shaft, whereby the cards may be brought into a convenient working position.

3. A card filing equipment comprising a supporting frame having bearings for a horizontal shaft, a horizontal shaft mounted in said bearings and a rotatable supporting member carried by said shaft, a plurality of card supporting trays mounted in planes extending substantially parallel to said shaft on said supporting member, and means for supporting said card trays for movement laterally of said supporting member in a direction similar to that of the shaft, whereby the cards may be brought into a convenient working position, said rotatable supporting member comprising a pair of end members mounted on the shaft and a plurality of flat sides carried by said end members, and radially projecting handles secured to the rotatable supporting member between said flat sides.

4. A card filing equipment comprising a supporting frame having bearings for a horizontal shaft, a horizontal shaft mounted in said bearings and a rotatable supporting member carried by said shaft, a plurality of card supporting trays mounted in planes extending substantially parallel to said shaft on said supporting member, and means for supporting said card trays for movement laterally of said supporting member in a direction similar to that of the shaft, whereby the cards may be brought into a convenient working position, said rotatable supporting member comprising a pair of end members mounted on the shaft and a plurality of flat sides carried by said end members, said flat sides being spaced at the corners of said supporting member by radially projecting handles, said handles comprising substantially flat members provided adjacent their outer edges with elongated apertures therethrough for receiving the fingers of the hand.

5. A card filing equipment comprising a supporting frame having bearings for a horizontal shaft, a horizontal shaft mounted in said bearings and a rotatable supporting member carried by said shaft, a plurality of card supporting trays mounted on said supporting member in planes extending substantially parallel to and defining a regular polygon concentric with said shaft, and means on said supporting member coacting with means on said card trays for releasably holding the card trays on the supporting member, whereby the card supporting trays and their cards may be moved from the supporting member to a convenient working position, and friction means for engaging said shaft and holding the rotatable supporting member in a predetermined position even when unbalanced by the removal of card supporting trays therefrom.

6. A card filing equipment comprising a supporting frame having bearings for a horizontal shaft, a horizontal shaft mounted in said bearings and a rotatable supporting member carried by said shaft, a plurality of card supporting trays mounted in planes extending substantially parallel to said shaft on said supporting member, and means for supporting said card trays for movement laterally of said supporting member in a direction similar to that of the shaft, whereby the cards may be brought into a convenient working position, said rotatable supporting member comprising a pair of substantially polygonal end members mounted on the shaft and a plurality of flat sides carried by said end members, radially projecting handles secured to the supporting member intermediate said flat sides, said handles comprising substantially flat members provided adjacent their outer edges with elongated apertures therethrough for receiving the fingers of the hand, said card trays each comprising a base member, and said handle members being provided with guides for slidably engaging said base member on the outer edges of said base member.

7. A card filing equipment comprising a supporting frame having bearings for a horizontal shaft, a horizontal shaft mounted in said bearings and a rotatable supporting member carried by said shaft, a plurality of card supporting trays mounted in planes extending substantially parallel to said shaft on said supporting member, and means for supporting said card trays for movement laterally of said supporting member in a direction similar to that of the shaft, whereby the cards may be brought into a convenient working position, said rotatable supporting member comprising a pair of end members mounted on the shaft and a plurality of flat sides carried by said end members, said flat sides being spaced at the corners of said supporting member by radially projecting handles, said handles comprising substantially flat members provided adjacent their outer edges with elongated apertures therethrough for receiving the fingers of the hand, said card trays each comprising a base member, and said handle members being provided with guides for slidably engaging said base member on the outer edges of said base member, said base member being provided with a pair of card holding members extending from end to end of said base member in parallel relationship to said outer edges and removably mounted thereon.

8. In a card filing equipment, a container member of substantially rectangular shape provided on its lower side with antifriction devices for engaging the floor of a building, a horizontal shaft located in said container member, a rotatable supporting member mounted on said shaft and substantially filling said container, and a plurality of card trays carried by said rotatable member and slidably mounted thereon for lateral movement parallel to said shaft.

9. In a card filing equipment, a desk provided with a desk top and a plurality of supporting posts, said supporting posts on three sides of the desk being joined by enclosing panels, and the front of said desk having openings between the supporting posts, one of said openings defining a drawer space, a container member of substantially rectangular shape provided on its lower side with antifriction devices for engaging the floor of a building in which the desk is located, said container member being provided on one side with a drawer facing for closing the opening in the drawer space, a horizontal shaft located in said container member, a rotatable supporting member mounted on said shaft and substantially filling said container, said container being of a size to slidably engage the walls of said drawer space, and a plurality of card trays carried by said rotatable member and slidably mounted thereon for movement parallel to said shaft, said drawer facing member having an upper pivoted section adapted to be turned down to expose a greater amount of the cards on said rotatable member for convenient use.

10. Card filing equipment comprising, in combination, support means; a horizontal shaft carried by said support means; a rotatable supporting member carried by said shaft for rotation about the axis of the shaft, said rotatable supporting member including end members spaced longitudinally of the shaft and extending outwardly in a radial direction therefrom, said end members having outer edge portions lying in planes defining a regular polygon concentric to the shaft, a plurality of flat sides carried by and extending between said edge portions of the end members, and handles secured to the rotatable supporting member and projecting outwardly beyond said flat sides in directions radial to the shaft and at positions intermediate the flat surfaces of said sides; card carrying trays having flat bases of a size for mounting on said flat sides of the rotatable member between said handles, said flat bases of the trays each being provided with card holding means extending in a direction parallel to the shaft; and means on said rotatable member for releasably holding each of said trays in position relative to said flat sides.

11. Card filing equipment comprising, in combination, support means; a horizontal shaft carried by said support means; a rotatable supporting member carried by said shaft for rotation about the axis of the shaft, said rotatable supporting member including end members spaced longitudinally of the shaft and extending outwardly in a radial direction therefrom, said end members having outer edge portions lying in planes defining a regular polygon concentric to the shaft, and a plurality of flat sides carried by and extending between said edge portions of the end members; card carrying trays having flat bases of a size for mounting on said flat sides of the rotatable member, said flat bases of the trays each being provided with card holding means extending in a direction parallel to the shaft; and means on said rotatable member for releasably holding each of said trays in position relative to said flat sides.

GEORGE C. BRUEN.

(References on following page)

REFERENCES CITED

The following references are of record in the file of this patent:

UNITED STATES PATENTS

| Number | Name | Date |
|---|---|---|
| 796,199 | Ellett | Aug. 1, 1905 |
| 896,294 | Hadden | Aug. 18, 1908 |
| 1,227,704 | Ulrich | May 29, 1917 |
| 1,269,243 | Young | June 11, 1918 |
| 1,942,856 | Davis | Jan. 9, 1934 |
| 2,235,736 | Bruen | Mar. 18, 1941 |
| 2,240,325 | Bruen | Apr. 29, 1941 |
| 2,334,785 | Mitchell | Nov. 23, 1943 |

FOREIGN PATENTS

| Number | Country | Date |
|---|---|---|
| 2,806 | Australia | Aug. 6, 1931 |

Certificate of Correction

Patent No. 2,424,144.                         July 15, 1947.

GEORGE C. BRUEN

It is hereby certified that error appears in the printed specification of the above numbered patent requiring correction as follows: Column 12, line 3, claim 8, strike out the word "lateral"; and that the said Letters Patent should be read with this correction therein that the same may conform to the record of the case in the Patent Office.

Signed and sealed this 21st day of October, A. D. 1947.

THOMAS F. MURPHY,
*Assistant Commissioner of Patents.*

REFERENCES CITED

The following references are of record in the file of this patent:

UNITED STATES PATENTS

| Number | Name | Date |
|---|---|---|
| 796,199 | Ellett | Aug. 1, 1905 |
| 896,294 | Hadden | Aug. 18, 1908 |
| 1,227,704 | Ulrich | May 29, 1917 |
| 1,269,243 | Young | June 11, 1918 |
| 1,942,856 | Davis | Jan. 9, 1934 |
| 2,235,736 | Bruen | Mar. 18, 1941 |
| 2,240,325 | Bruen | Apr. 29, 1941 |
| 2,334,785 | Mitchell | Nov. 23, 1943 |

FOREIGN PATENTS

| Number | Country | Date |
|---|---|---|
| 2,806 | Australia | Aug. 6, 1931 |

Certificate of Correction

Patent No. 2,424,144.     July 15, 1947.

GEORGE C. BRUEN

It is hereby certified that error appears in the printed specification of the above numbered patent requiring correction as follows: Column 12, line 3, claim 8, strike out the word "lateral"; and that the said Letters Patent should be read with this correction therein that the same may conform to the record of the case in the Patent Office.

Signed and sealed this 21st day of October, A. D. 1947.

THOMAS F. MURPHY,
*Assistant Commissioner of Patents.*